US008386281B2

(12) United States Patent
Goodermuth et al.

(10) Patent No.: US 8,386,281 B2
(45) Date of Patent: Feb. 26, 2013

(54) LOCOMOTIVE ASSISTANT

(75) Inventors: Todd Goodermuth, Satellite Beach, FL (US); Jared Cooper Klineman, Palm Bay, FL (US)

(73) Assignee: General Electric Company, Schenectady, NY (US)

(*) Notice: Subject to any disclaimer, the term of this patent is extended or adjusted under 35 U.S.C. 154(b) by 603 days.

(21) Appl. No.: 12/356,186

(22) Filed: Jan. 20, 2009

(65) Prior Publication Data

US 2010/0185472 A1   Jul. 22, 2010

(51) Int. Cl.
| G06Q 10/00 | (2012.01) |
| G05D 1/00 | (2006.01) |
| G05D 3/00 | (2006.01) |
| G06F 7/00 | (2006.01) |
| G06F 17/00 | (2006.01) |
| B61L 23/00 | (2006.01) |
| A63H 1/24 | (2006.01) |
| B60L 3/02 | (2006.01) |
| B61L 17/00 | (2006.01) |
| B61L 27/00 | (2006.01) |
| B61L 3/22 | (2006.01) |
| B61L 5/00 | (2006.01) |
| B61L 5/12 | (2006.01) |
| B61L 9/00 | (2006.01) |

(52) U.S. Cl. .......... 705/7.11; 701/19; 246/1 R; 246/2 R; 246/3; 246/1 C; 246/7; 246/488

(58) Field of Classification Search ................ None
See application file for complete search history.

(56) References Cited

U.S. PATENT DOCUMENTS

| 6,345,257 | B1 | 2/2002 | Jarrett |
| 6,738,748 | B2 | 5/2004 | Wetzer |
| 7,076,343 | B2 * | 7/2006 | Kornick et al. ................. 701/19 |
| 7,149,702 | B1 | 12/2006 | Smith et al. |
| 7,188,341 | B1 | 3/2007 | Hawthorne et al. |
| 7,239,943 | B2 * | 7/2007 | Peltz ............................. 701/19 |
| 7,263,475 | B2 | 8/2007 | Hawthorne et al. |
| 7,966,126 | B2 * | 6/2011 | Willis et al. .................. 701/220 |
| 2002/0165647 | A1 * | 11/2002 | Glenn et al. ...................... 701/3 |
| 2002/0198755 | A1 | 12/2002 | Birkner et al. |
| 2003/0055666 | A1 | 3/2003 | Roddy et al. |
| 2003/0069648 | A1 | 4/2003 | Douglas et al. |
| 2003/0195904 | A1 | 10/2003 | Chestnut et al. |
| 2004/0064328 | A1 | 4/2004 | Keranen |

(Continued)

OTHER PUBLICATIONS

"Supporting Railroad Roadway Worker Communications with a Wireless Handheld Computer: vol. 1: Usability for the Roadway Worker", U.S. Department of Transportation Research and Special Programs Administration John A. Volpe National Transportation Systems Center, Oct. 2004, available at http://www.fra.dot.gov/downloads/RRDev/ord0413i.pdf.*

(Continued)

*Primary Examiner* — Ryan Zeender
*Assistant Examiner* — Allen Chein
(74) *Attorney, Agent, or Firm* — GE Global Patent Operation; John A. Kramer

(57) ABSTRACT

There is provided a system for managing information comprising a network, a hand-held mobile device, and a central server computer. The network is established between the central server computer and the hand-held mobile device to communicate computer readable information between the central server computer and the hand-held mobile device. In an embodiment, the computer-readable information is human interface information related to operation of a train.

27 Claims, 4 Drawing Sheets

U.S. PATENT DOCUMENTS

| | | | |
|---|---|---|---|
| 2004/0117155 | A1 | 6/2004 | Lane et al. |
| 2004/0176884 | A1* | 9/2004 | Hungate et al. .................. 701/19 |
| 2004/0181443 | A1 | 9/2004 | Horton et al. |
| 2005/0182650 | A1 | 8/2005 | Maddox et al. |
| 2007/0112608 | A1 | 5/2007 | Avery et al. |
| 2007/0156492 | A1* | 7/2007 | Hawkins et al. .................. 705/8 |

OTHER PUBLICATIONS

"Supporting Railroad Roadway Worker Communications with a Wireless Handheld Computer: vol. 2: Impact on Dispatcher Performance", U.S. Department of Transportation Research and Special Programs Administration John A. Volpe National Transportation Systems Center, Oct. 2004, available at http://www.fra.dot.gov/downloads/RRDev/ord0413ii.pdf.*

GCOR: General Code of Operating Rules, Fifth Edition, 2005, available at http://modernrailroading.com/DigitalLibrary/GCOR_Rules/GCOR_Rules.pdf.*

CORA Special Instructions Sixth Edition—Oct. 1, 2007, available at http://www.bletcnwcgca.org/files/CORA_Guide_10-1-07_.pdf.*

Ronald A. Lindsey, "An Analysis of the Opportunities for Wireless Technologies in Passenger and Freight Rail Operations", Federal Railroad Administration Department of Transportation, Dec. 2007, available at http://www.fra.dot.gov/downloads/research/ord0802.pdf.*

Rail Systems Improving Efficiency and Safety in the Rail Industry. Lockheed Martin, 2008, available at http://www.ctilidar.com/data/assets/ms2/pdf/Rail_Systems_brochure.pdf.*

Positive Train Control: Synthesis, Aaron Poor, Jul. 27, 2009, available at http://www.wsdot.wa.gov/NR/rdonlyres/02C99DEC-840D-4426-87F0-977FC3063F2C/62563/PositiveTrainControl.pdf.*

Federal Railroad Administration forms, available at http://safetydata.fra.dot.gov/OfficeofSafety/publicsite/Forms.aspx.*

Gideon Ben-Yaacov, Gary A. Ruegg, "Technological Advances in Railroads' Work Order Reporting Systems", 1989, Automated Monitoring and Control International, Inc.*

CISCO Systems, Inc., *CSX Transportation Stays on Track with IP Mobility*, 2005, pp. 1-6.

Electronic FRA Test and Inspection System Brochure (retrieved from http://www.theaimsgroup.com/files/pdf/ElectronicFRATestingBrochure.pdf), date of publication unknown.

Announcement, 10 East teams up with Sharp Electronics (retrieved from http://www.myzaurus.com/downloads/csxCaseStudy.pdf), date of publication unknown.

Ben-Yaacov, Gideon, "Technological Advances in Railroads' Work Order Reporting Systems", Automated Monitoring and Control International, Inc., 85-91 pgs., 1989.

\* cited by examiner

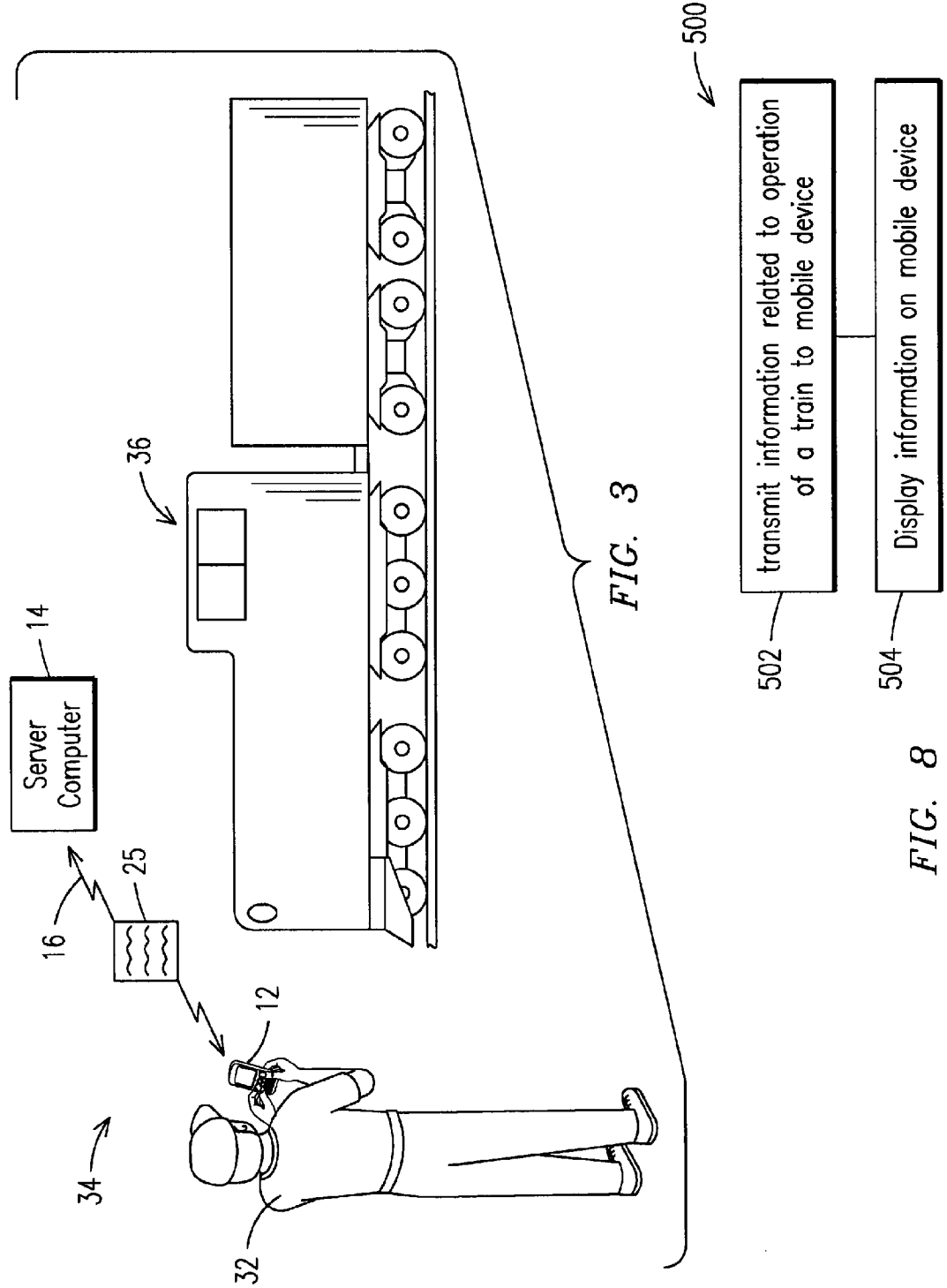

LOCOMOTIVE ASSISTANT

BACKGROUND OF THE INVENTION

The present invention relates generally to a system and method for the management of computer-readable information related to the operation of a train.

The daily operation of a train is known to require a significant amount of paperwork. From the time a crew arrives at a rail yard to operate a train to the time the crew traverses a railway to arrive at its destination, the crew typically accumulates and necessarily refers to a multitude of paper documents. Further, many of these documents require a member of the crew to fill in information, as well as sign the document. In addition, many of these documents, e.g., inspection reports, must be assembled and turned in periodically to a central administrative office for review and archiving of the documents. The administrative office may be at the same location as the crew or may be at an additional remote location. Not only is the amount of paperwork cumbersome and prone to error, but the documents provided to the crew necessarily lack real-time information.

BRIEF DESCRIPTION OF THE INVENTION

In accordance with one aspect of the present invention, there is provided a system for managing information. The system comprises a network, a hand-held mobile device, and a central server computer. The network is established between the central server computer and the hand-held mobile device to communicate computer readable information between the central server computer and the hand-held mobile device. In the system, the computer-readable information is used for operating a train, or is otherwise related to operation of a train. (As used herein, "train" refers to one or more rail vehicles, where at least one of the rail vehicles is a locomotive. If the train includes plural rail vehicles, the rail vehicles are interconnected for coordinated motoring.) In an embodiment, the computer-readable information is human interface information, by which it is meant information communicated to a human, in text and/or picture form, which the human reads from the hand-held mobile device and uses for some purpose in operating the train independent of the hand-held mobile device, and/or which informs the human of a type of data that the human is requested to collect (e.g., the data is used for and/or relates to operation of the train) and enter into the hand-held mobile device for communication back to the central server.

In accordance with another aspect of the present invention, there is provided a method for managing information comprising transmitting computer-readable information from a central server computer to a hand-held mobile device over a network and displaying the computer-readable information on a display of the hand-held mobile device. The computer-readable information is human interface information related to operation of a train.

In accordance with yet another aspect of the present invention, there is provided a method for managing information. The method comprises transmitting a user-fillable document used for operating a train from a central server computer to a hand-held mobile device over a network. In addition, the method comprises receiving a completed version of the user-fillable document at the central server computer transmitted from the hand-held mobile device over the network. Further, the method comprises storing the completed version of the user-fillable document on at least one of the central server computer and/or a portable memory device.

In accordance with still another aspect of the present invention, there is provided a method for managing information. The method comprises compiling a plurality of computer-readable documents used for operating a train to form a train operations kit at a central server computer. In addition, the method comprises transmitting one or more of the plurality of computer-readable documents of the train operations kit from the central server computer to a hand-held mobile device over a network. Further, the method comprises displaying the one or more computer-readable documents on a display of the hand-held mobile device.

BRIEF DESCRIPTION OF THE DRAWINGS

A more particular description of the embodiments of the invention briefly described above will be rendered by reference to specific embodiments thereof that are illustrated in the appended drawings. Understanding that these drawings depict only typical embodiments of the invention and are not, therefore, to be considered to be limiting of its scope, the embodiments of the invention will be described and explained with additional specificity and detail through the use of the accompanying drawings in which:

FIG. 3 is another schematic illustration of a system for managing information related to the operation of a train in a rail yard environment according to the present invention;

FIG. 8 is a flow chart depicting a method for managing information used related to operation of a train in accordance with an aspect of the present invention;

DETAILED DESCRIPTION OF THE INVENTION

In describing particular features of different embodiments of the present invention, number references will be utilized in relation to the figures accompanying the specification. Similar or identical number references in different figures may be utilized to indicate similar or identical components among different embodiments of the present invention.

The present invention is directed to a system and method for the management of information related to the operation of a train in a rail yard, along a railway, or at any other location. In particular, aspects of the present invention digitize the daily operations of a train in a rail yard or along the railway, for example, thereby eliminating the need for cumbersome, time-consuming, and expensive paper-based processes on-board the train. Aspects of the present invention also reduce the cost of maintaining proper locomotive and train records; reduce the cost of raw materials, e.g., paper and print/copy/fax equipment; reduce the recording of inaccurate data, e.g., misnumberings and misspellings; and may save train crews substantial time in their pre-departure and arrival duties.

Figure 1:
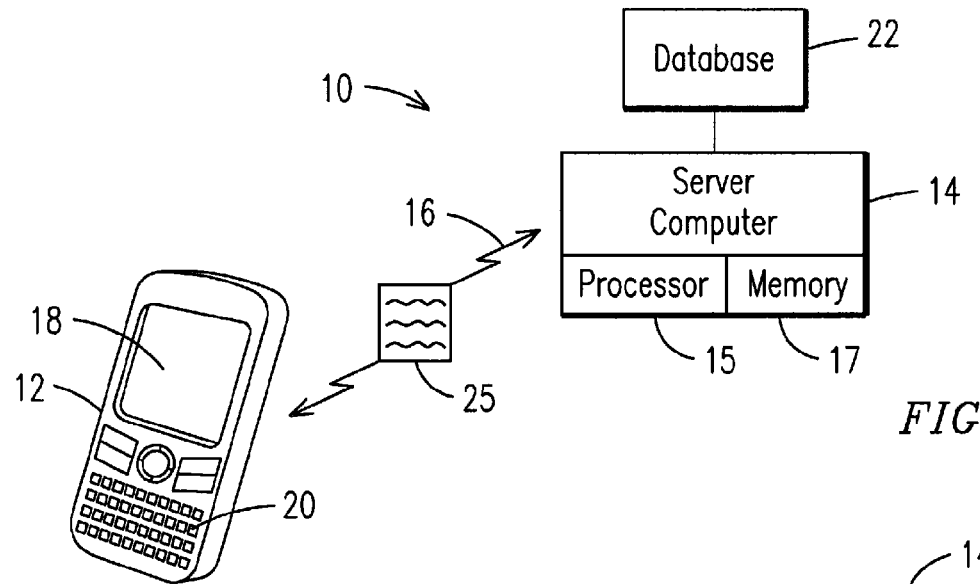
FIG. 1 is a schematic illustration of an exemplary embodiment of a system for managing information related to operation of a train in accordance with an aspect of the present invention.

Referring now to FIG. 1, an embodiment of a paperless documentation management system 10 is shown as including one or more hand-held mobile devices 12 in communication with a central server computer 14 over a network 16. By "hand-held mobile device," it is meant a hand-held, mobile computerized device having a processor that may be used for the access, addition, display, compilation, computation, receipt, selection, transmittal, viewing, and/or storage of information, or any other information management function. Though one or more hand-held mobile devices are contemplated, the singular phrase "device 12" will be shown and described for convenience. In an embodiment, the device 12 may be any Microsoft Windows®-based device or a Palm OS-based hand-held device. In another embodiment, as shown in FIG. 3, the device 12 may be carried by an operator 32, for example, while aboard a train 36, at the rail yard, or the like. In another embodiment, the device 12 may be in the form of a vehicle-installed mobile computer device that is optionally removably installed or that is in communication with a standard display unit of a locomotive cab of the train 36.

The device 12 optionally comprises a display 18 and any suitable structure for inputting information into the device 12, such as a keyboard 20 as shown, a touchpad on the display 18, a hand-held implement (stylus), or the like. The device 12 may further comprise any suitable component known in the art for enabling the device 12 to communicate with the central server computer 14 via the network 16, including but not limited to a modem, a network interface, or the like. By communicating with the central server computer 14, the device 12 may transmit and receive information 25 from the central server computer 14 as shown in FIG. 1 in real-time or near real-time. Optionally, the information 25 may be transmitted between the device 12 and the central server computer 14 in an encrypted format for improved security of the information.

The central server computer 14 typically includes a processor 15 and a memory 17, and may operate in response to one or more software programs stored thereon or on a storage medium accessible by the central server computer 14. The software programs may include, but are not limited to, programs capable of the display, compilation, computation, receipt, selection, transmittal, and/or viewing of computer-readable information (information 25) related to the operation of a train.

As used herein, the information 25 may be defined as any data in any computer-readable form that is transferred between the central server computer 14 and the device 12. By "related to operation of a train" or "related to the operation of a train," it is meant that the information 25 is used for some purpose in operating the train independent of the hand-held mobile device 12, and/or which informs the operator 32 (human) of a type of data that the human is requested to collect (e.g., the data relates to operation of the train) and enter into the hand-held mobile device for communication back to the central server. In an embodiment, the computer-readable information is human interface information, by which it is meant information communicated to a human, in text and/or picture form, which the human reads from the mobile device and which relates to the operation of a train. In one embodiment, the computer-readable information is required or suggested by a Federal regulatory authority, e.g., the Federal Railroad Agency (FRA) or any other agency, to be carried by a member of a crew, e.g., train crew, or is any other information that is required for or aids in the daily operation of a train, such as the inventory of the train, the scheduling of planned activities for the train, or the movement of the train between two destinations. Also, by "related to operation of a train" or "related to the operation of a train," it is meant that the information 25 is either presently in use, was used previously, or may be used in the future for any activity related to the operation of a train.

The network 16 established between the central server computer 14 and device 12 to communicate computer readable information (information 25) between the central server computer 14 and the device 12 may be any type of known wireless network including a local area network (LAN), wide area network (WAN), a global network (e.g., Internet), an intranet, an extranet, or the like. In one embodiment, the network 16 is a wireless local area network (WLAN) as shown in FIG. 1. As an example, the WAN may be based on an 802.11 specification, otherwise known as "Wi-Fi" due to the fact that an organization called Wi-Fi Alliance provides certification for products that conform to 802.11.

As shown in FIG. 1, the central server computer 14 may include or is otherwise in communication with one or more databases, e.g., database 22, by any suitable connection known in the art. FIG. 1 depicts the database 22 as a peripheral device, but it is understood that the database 22 may be stored in a memory of the central server computer 14 or on a portable memory device. In an embodiment, the database 22 comprises a variety of information, reference materials, or data related to the operation of a train, including but not limited to manuals, rulebooks, authority forms, inspection forms, track authorities, track restrictions, time tables, wheel reports, switch lists, and the like. Changes to each of the databases may be made dynamically, in real-time or near real-time, to update information contained in the databases as set forth below. The central server computer 14 is thus able to receive and access real-time data or near real-time information from the databases as needed to compile forms related to operation of a train as set forth below.

The information 25 related to the operation of a train and transmitted to the device 12 may be stored in databases, e.g., database 22, in the form of a suitable standardized data file (e.g., comma delimited files, XML files, PDF files, and the like.) In an embodiment, the information 25 comprises a plurality of XML files, which allows the information to be easily transmitted over the network 16 as set forth herein. Optionally, the central server computer 14 may also include a firewall to prevent unauthorized access to the central server computer 14 and enforce any limitations on authorized access. The firewall may be implemented using conventional hardware and/or software as is known in the art.

Figure 2:
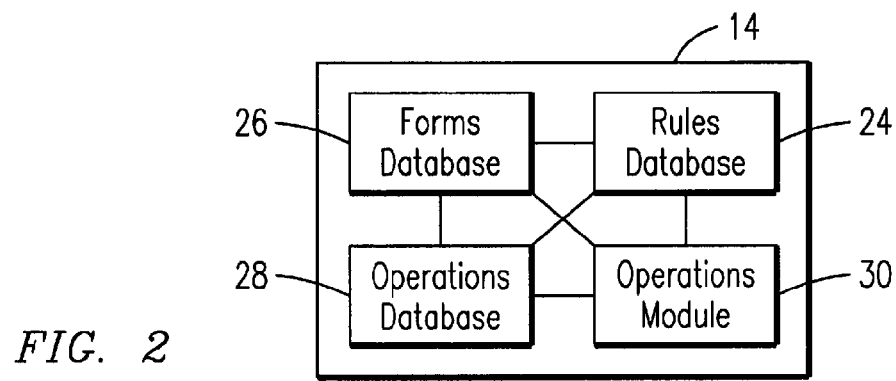
FIG. 2 is a block diagram of a central server computer in accordance with an aspect of the present invention.

In a particular embodiment, as shown in FIG. 2, the database 22 associated with the central server computer 14 comprises a plurality of databases, each comprising a type of information related to the operation of a train as will be set forth below. In the embodiment shown in FIG. 2, the database associated with the central server computer 14 comprises a rules database 24, a forms database 26, and an operations database 28, each of which may be in communication with one another and with an operations module 30. The use of the illustrated databases is understood to be exemplary and the databases may be structured differently depending on the organizational desires and needs of the user. Below, the use of each of the databases 24, 26, and 28 and operations module 30 is described with respect to an aspect of the operation of a train. It is understood that the system 10 may be used in any one or more of the environments set forth herein, such as in a rail yard or along a railway, or alternatively in any other environment where a train may be operated.

In an embodiment, the central server computer includes a module, e.g., operations module 30, which comprises software for the communication with the databases 24, 26, 28 to assemble one or more computer-readable documents related to the operation of a train. Specifically, operations module 30 may retrieve, store, organize, and/or compile data contained within any of the databases 24, 26, 28 to generate computer-readable forms or to retrieve already generated-forms in the database. In this way, the central server computer 14 may generate real-time or near real-time documents by retrieving information from the databases as described in further detail below. Optionally, a middleware client for the central server computer 14 may also be provided to manage communications between the central server computer 14, the databases 24, 26, 28 and the device 12. The information 25 may be transmitted from the central server computer 14 to the device 12 automatically or via the operator 32 utilizing the device 12 to request the information 25 from the central server computer 14. For example, the information 25 may be transferred to the device 12 based upon a detection of wireless connectivity with the central server computer 14.

The use of the above-described system 10 in the operation of a train will be explained below in chronological fashion to illustrate the environments and the different types of information 25 contemplated by the present invention. However, it is understood that the present invention is not so limited to the following description, the information 25 (e.g., documents) described therein, or the order in which the information 25 is presented. First, at the beginning of a shift, it is typical for a train crew (which typically includes an engineer and a conductor) to arrive at a rail yard and receive a plurality of hard copy documents for review and completion. These hard copy documents may include rule books and rule book updates that set forth guidelines for the safe and efficient operation of the train, time table updates having scheduled tasks to be completed at certain times during the day, as well as train orders, track authorities, and/or track restrictions that authorize, direct, and/or prohibit a train from traveling in a particular direction to a particular destination at certain times during the day. Many of these hard-copy documents are required to be initialed and/or signed, and carried by a train crew. Any number of these documents may be lost, soiled, torn, or otherwise damaged. Aspects of the present invention, however, aim to make paperless the processes that would otherwise require the assembly, handling, and completion of such hard-copy documents.

First, upon arrival of the crew at a rail yard, the crew may utilize the system 10 to obtain the necessary documents to prepare for travel of the train, e.g., necessary rule/regulation documents. To provide the crew with such documents in electronic form in an embodiment of the present invention, the rules database 24 (shown in FIG. 2) comprises any computer-readable document that sets forth guidelines and information for the safe and efficient operation of the train, such as general bulletins, rule books, and rule book updates. As shown in FIG. 3, an operator 32 (which may be one or more of the engineer, a wayside worker, a conductor, or other individual), may utilize the device 12 in the rail yard 34 to access, upload, and/or obtain requisite rule books and rule book updates, for example, from the rules database 24 related to the operation of a train, e.g., train 36. Specifically, the operator 32 may input a request to the central server computer 14 using the device 12 to request a particular document from rules database 24. The central server computer 14 may then recall the requested document from the rules database 24 and transmit the requested computer-readable document to the operator 32 over the network 16.

Alternatively, the central server computer 14 may be programmed to automatically deliver the information 25 from the central server computer 14 to the device 12 at a particular time, such as upon logging onto the device 12 or via GPS tracking, or the like. In an embodiment, for example, the device 12 may require the operator 32 to enter a unique identifier such that when the train 36 arrives in the rail yard 34, the operator 32 may input an identifier, e.g. password, passcode, operator number, train number, or the like into the device 12 such that the central server computer 14 transmits the information 25 based on the presence and location of the operator 32 and/or device 12. In this way, the system 10 may be utilized to manage, track, and store the working hours of the operator or crew utilizing the device 12.

Figure 4:
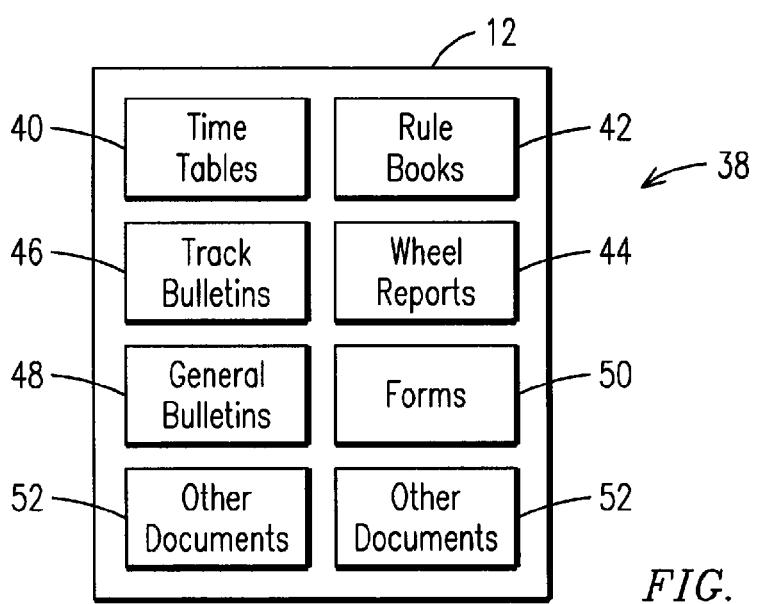
FIG. 4 is an illustration of a selectable menu on a display of a hand-held mobile device in accordance with an aspect of the present invention.

As shown in FIG. 4, in an embodiment, the device 12 may include a selectable menu 38 that is provided on the display 18 of the device 12. The selectable menu 38 may include a plurality of visible, selectable icons on the display that may be selectable by touch, an implement, or the like. In the embodiment shown in FIG. 4, the icons comprise time tables 40, rule books 42, wheel reports 44, track bulletins 46, general bulletins 48, forms 50, and other documents 52. It is understood that any other suitable or preferred organizational structure may be utilized. In this way, in the embodiment described above with respect to FIG. 3, the operator 32 may select the rule books 42 icon to further provide a sub-menu of selectable documents. The central server computer 14 may transmit the selected document to the device 12 for viewing of the document immediately and/or the document may be maintained in a temporary or permanent memory of the device 12 for viewing at a desired time. The selected document may be viewed using any suitable program provided on the device 12 for selecting, opening, reading, and/or closing the files, e.g., any suitable Windows®-based program.

Figure 5:
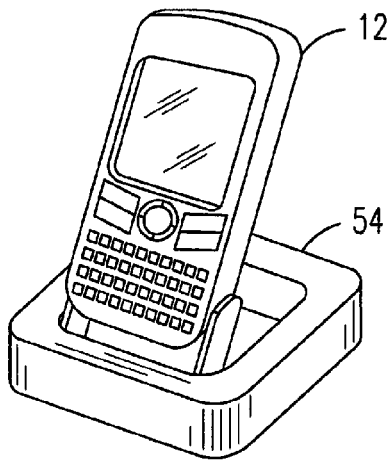
FIG. 5 is a perspective view of a hand-held mobile device disposed within a docking station in accordance with an aspect of the present invention.

In an embodiment, to synchronize the transfer of information, e.g., a document from rule books 42, between the central server computer 14 and the device 12, the system 10 may further include a docking station 54 as shown in FIG. 5. To transfer the information 25, including the computer-readable documents, from the central server computer 14 and the device 12, the operator may place the device 12 on the docking station 54. In this way, the information 25 transferred to the device 12 from the central server computer 14 may be real-time or near real-time information. For example, a wheel report transmitted from the central server computer 14 to the device 12 may comprise real-time inventory information for a particular train. Alternatively, the device used to synchronize the transfer of the information 25 between the central server computer 14 and the device 12 may be any other wired network access point or wireless network access point for the device 12 that is configured to synchronize the transfer of the information 25 between the central server computer 14 and the device 12.

The operations database 28 may include template forms and/or raw data required for the operations module 30 to compile a computer-readable document having real-time or near real-time information, such as a time table or switch list. For example, in one embodiment, the operator 32 at the rail yard may be provided with a time table, a switch list, and a wheel report prior to operation of the train 36. A switch list comprises information for regulating switching activities and typically includes a plurality of tasks to be completed at certain times during the subject day. In addition, a time table sets out information for scheduling the operation of a train, e.g., a predetermined list of arrival times and departure times, and destinations from which the train 36 is scheduled to arrive and depart. A wheel report, on the other hand, is a listing detailing all train cars and locomotives in a typical train. In one embodiment, a computer-readable time table may be compiled by the operations module 30 using raw data located in the operations database 28 of the central server computer 14. Thereafter, upon compilation of the time table, switch list, or wheel report from the operations module 30, the time table, switch list, or wheel report (information 25) may be transmitted from the central server computer 14 to the device 12 for review by the operator 32 as described herein over the network 16. In an embodiment, the time table, switch list, or wheel report is transmitted to the device 12 from the central server computer 14 via placing the device 12 on the docking station 54. Once opened, the time table, switch list, or wheel report may be read by the operator 32 selecting the time tables 40, wheel reports 44, and/or other documents 52 icons on the device 12 and viewing the same on the display 18 of the device 12.

Once the train leaves the rail yard, the train crew is further required to routinely manage a plurality of information and physically have the data on their person. This information may include inspection/report forms, track authorities, track restrictions, and the like. Track restrictions authorize and direct a train to travel in a direction to a destination at certain times on a particular track. Track authorities are issued granting main track use between two named points (e.g., milepost sign, station, and/or any fixed physical point, such as a switch). Similar to the discussion above regarding the rules database 24, the operator 32 may view desired track information on the display 18 of the device 12 by selecting, for example, the track bulletins icon 46 (shown in FIG. 2). Thereafter, the operations module 30 of the central server computer 14 may obtain the requested document from operations database 28 and transmit the selected document (information 25) to the device 12 for viewing of the document immediately on the display 18 and/or the document may be maintained in a temporary or permanent memory of the device 12. In an embodiment, the requested information may be transmitted to the device 12 from the central server computer 14 via placing the device 12 on the docking station 54.

Further, during travel of the train 36, a number of documents for the operation of the train 36 may require data to be entered by the operator 32, including initializing or time-stamping of the documents. In an embodiment of the present invention, the system 10 enables information 25, e.g., a user-fillable and computer-readable form, to be retrieved by the operator, filled out, and transmitted back to the central server computer 14. To accomplish this, the forms database 26 may include therein a template of various user-fillable documents, including any type of form related to the operation of a train, including without limitation signal awareness forms, signal reports, pickup/set-out forms, brake inspection forms, other inspection reports, track warrants, failure reports, form A & B updates, any other form requiring the entry of information by the FRA, or the like. It is understood that the databases described herein, e.g., the forms database 26, may include one or more databases or may be combined with any other database as described herein.

To complete the form, the operator 32 may select the forms 50 icon on the menu of the device 12 as shown by FIG. 4. Thereafter, the operator 32 may scroll through a sub-menu for the particular form he/she desires to complete. The central server computer 14 will obtain the requested document from the forms database 26 and the operations module 30 will transmit the requested document to the operator 32. Using an input device provided for the device 12 (e.g., keyboard 20 or the like), the operator 32 may input the required information (e.g., signature, time information, location, or the like) into the selected form as would be performed manually. The completed form 58 may then be transmitted from the device 12 to the central server computer 14 over the network 16. At the central server computer 14, one or more of the completed forms 58 may be stored within a memory of the central server computer 14, an associated database, or any suitable data storage medium. The memory may be any suitable magnetic device (e.g., hard drives, card strips, or the like), optical device (e.g., CD-ROM, DVD, or the like), memory devices (USB thumb drives, virtual memory, RAM, etc.), and the like.

Alternatively, the operator 32 may store the completed forms 58 (or any other information 25) from the device 12 onto a portable memory device or the like. In this way, the operator 32 may provide his or her own records for safekeeping and for potential useful information in the event of a problem or accident. The completed forms may be stored in an unmodifiable format, such as a PDF document.

After travel of the train 36 along a rail way, the train crew arrives at a destination (e.g., a rail yard), enters the yard office, and signs in either manually or via the aid of a computer. The crew also then typically completes a tie-up form at the arrival yard. In addition, at the destination, the crew may receive paper-based instructions and/or work orders in order to complete switching activities at the rail yard if not done so already. Switching activities include the movement of rail cars from one track to another in order to deliver and/or pick up particular rail cars. Further, the crew may be given safety rules and track bulletins for the particular rail yard as described above. Because of changes to the switching activities that may take place throughout the day, the documents provided to the operator 32 previously may include confusing hand-written changes and the like.

The present invention instead may provide real-time or near real-time information for the switching activities of the train 36 at an arrival rail yard by enabling the operator 32 to obtain a switch list that includes updated real-time information using the device 12. For example, similar to the discussion above with respect to a time table, a computer-readable switch list may be compiled by the operations module 30 using raw data stored in and/or transmitted to the operations database 28 of the central server computer 14. Thereafter, upon request, the operations module 30 may transmit the switch list (information 25) from the central server computer 14 to the device 12 for review by the operator 32. In one embodiment, the switch list is read by the operator 32 selecting the other documents 52 icon on the device 12 and viewing the same on the display 18 of the device 12. As described above, the switch list may be automatically transmitted to the operator 32, at a particular time, based on a location of the operator 32 and/or associated train, e.g., train 36, or via placement of the device 12 on a docking station 54.

In addition, after travel of the train 36 along a rail way and the completion of switching activities, the train crew may typically provide a tie-up form along with all documents and forms previously completed and collected during the operation of the train. This documentation is typically submitted to staff at the destination facility and is archived at the facility, or is sent via facsimile or the like to a central office. Instead of assembling a voluminous amount of paper documents, the central server computer 14 may be continuously compiling information associated with a particular train, or a train crew/ operator to provide a single file or single database in a memory of the central server computer 14. In addition, the central server computer 14 may transmit any further documents in computer-readable form to be completed by the operator 32 (if necessary), including but not limited to a tie-up form, from the central server computer 14 to the operator 32.

Figure 6:
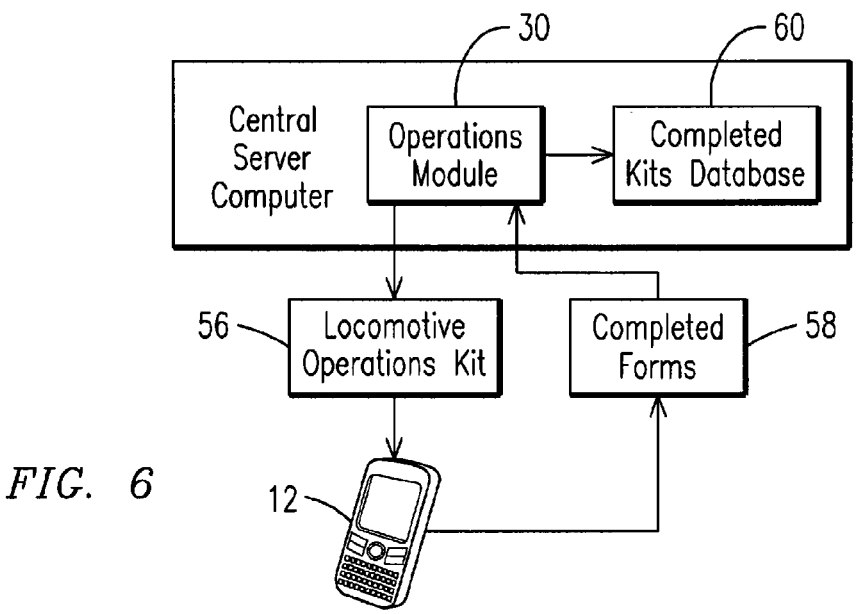
FIG. 6 is a schematic illustration of a system for providing information in the form of a computer-readable train operations kit according to an aspect of the present invention.
Figure 9:
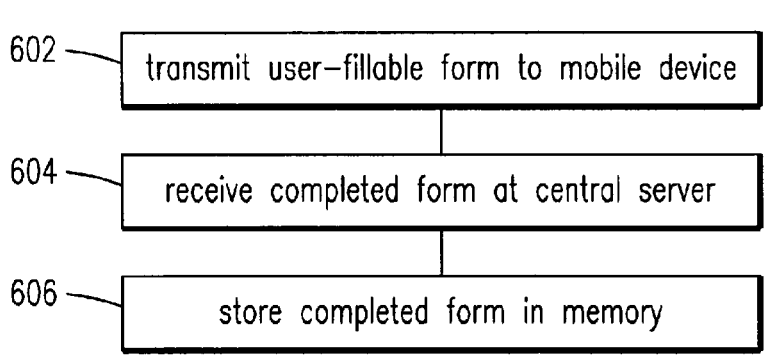
FIG. 9 is a flow chart depicting a method for managing information related to operation of a train in accordance with another aspect of the present invention.

In an embodiment, all of the documents described above may be provided collectively as a train operations kit 56 as shown in FIG. 6. To provide the train operations kit 56, the operations module 30 may include software or the like for compiling the necessary documents to be transmitted to the device 12, the operator 32, and/or the train 36 in the rail yard 34, along a rail way, or to a wayside worker. It is understood that components of information in the train operations kit 56 may be transmitted piecemeal as described above or as a single file to the device 12 upon the start of a shift. Upon the completion of any forms requiring data entry by the operator 32 and transfer of any completed forms 58 to the central server computer 14, the operations module 30 may also compile a completed kit and store the same in a memory associated with the operations module 30 or the central server computer 14, or other database, e.g., completed kits database 60, within the central server computer 14.

Figure 7:
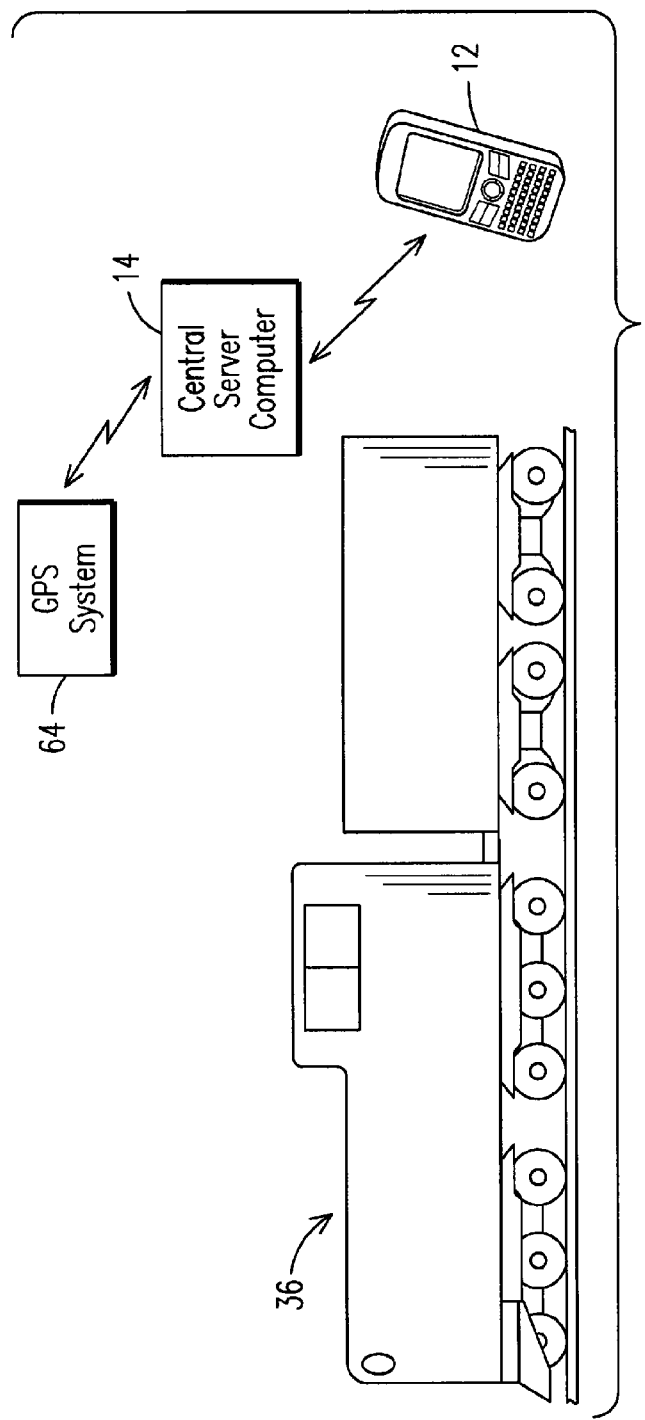
FIG. 7 is a schematic illustration of another system for managing information related to the operation of a train in a rail yard environment according to another aspect of the present invention.
Figure 10:
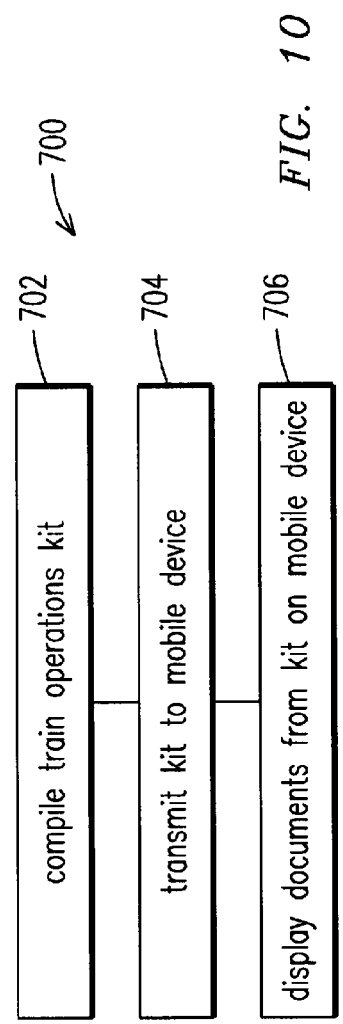
FIG. 10 is a flow chart depicting a method for managing information related to the operation of a train in accordance with yet another aspect of the present invention.

Further, as shown in FIG. 7, in any of the above-described embodiments, the train 36 may include a global positioning system (GPS system) 64 in communication with the device 12. At any time, upon request or automatically, the GPS system 64 may report the position of the train 36 to the central server computer 14 via the network 16. The GPS system 64 may be in communication with one or more of the operator 32, device 12, and/or the train 36 such that the location of one or more of the operator 32, device 12, and/or the train 36 is provided to the central server computer 14. In response, the central server computer 14 may automatically transfer information that is relevant to a location of the operator 32, the device 12, and/or the train 36, such as track bulletins pertaining to a location within a certain vicinity, e.g., 0.5 mile (0.8047 kilometer), of the train.

In addition, the central server computer 14 may further include safety interlocking logic to be executed by the processor 15. The safety interlocking logic may use data from all trains, for example, within a particular vicinity to issue limits of movement authority (LoMA) and speed limits to each train and to maintain safe separation distances between particular trains. In an embodiment, the central server computer 14 may transmit LoMA and speed limit data to the device 12 such that the operator 32 may monitor the LoMA and speed limit data against actual train location and speed of the train 36 to determine potential and actual unsafe conditions. If the train is approaching the end of its LoMA or exceeds a predetermined value, for example, the device 12 may warn the operator 32, who is expected to take appropriate action. In this way, in this embodiment, the present invention is able to provide trains not having a positive train control (PTC) system with a similar type of PTC data and with situational awareness to take appropriate action. Some of this PTC data may include limits of authorities and track warnings when approaching speed limits based on the position of the train, GPS measured speed, and a database of speed restrictions stored in the central server computer 14, in any database discussed above, and/or another database.

The present invention includes a number of methods for utilizing the system as described above. In one embodiment, as shown in FIG. 5, there is provided a method 500 for managing information comprising step 502 of transmitting computer-readable information (information 25) from the central server computer 14 to the hand-held mobile device 12 over the network 16. The computer-readable information is human interface information related to operation of the train 36. The method further includes step 504 displaying the computer-readable information on the display 18 of the device 12.

In accordance with yet another aspect of the present invention, there is provided a method 600 for managing information comprising step 602 of transmitting a user-fillable document (information 25) used for operating a train, e.g., train 36, from the central server computer 14 to the hand-held mobile device 12 via the network 16. In addition, the method 600 further comprises step 604 of receiving a completed version of the user-fillable document at the central server computer 14 transmitted from the hand-held device 12. Typically, the user-fillable document is completed by an operator 32 via the hand-held device 12 to provide the completed version of the user-fillable document. The method further comprises step 606 of storing the completed version of the user-fillable document on at least one of the central server computer 14 and/or a portable memory device. In addition, the method 600 may further comprise storing a plurality of the completed user-fillable documents into a single database on at least one of the central server computer 14 and/or a portable memory device.

In accordance with still another aspect of the present invention, there is provided a method 700 for managing information. The method 700 comprises step 702 of compiling a plurality of computer-readable documents (information 25) used for operating a train, e.g., train 36, to form a train operations kit 56 at the central server computer 14. In addition, the method comprises step 704 of transmitting one or more computer-readable documents of the train operations kit 56 from the central server computer 14 to the device 12 over the network 16. The method further comprises step 706 of displaying the one or more computer-readable documents on a display 18 of the device 12. The train operations kit 56 includes any one or more of the computer-readable documents and/or information set forth herein.

Embodiments described above may be implemented on a suitable computer system, controller, memory, or generally a computer readable medium. For example, the steps of the methods described above may correspond to computer instructions, logic, software code, or other computer modules disposed on the computer readable medium, e.g., floppy disc, hard drive, ASIC, remote storage, optical disc, or the like. The computer-implemented methods and/or computer code may be programmed into any computing device having a processor, such as a mobile device or a central server computer, or the like, as described above.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

That which is claimed is:

1. A system comprising:
    a hand-held mobile device configured to be communicatively coupled with a server computer by at least a portion of a network, the mobile device configured to communicate computer-readable information related to operation of a rail vehicle with the server computer over a trip of the rail vehicle, wherein prior to the rail vehicle beginning to move on the trip the mobile device is configured to receive first information transmitted from the server without human intervention, the first information comprising at least one of rules information, time table information, switch information, or a wheel report as the computer-readable information, wherein during travel of the rail vehicle along the trip, the mobile device is configured to receive a form transmitted from the server without human intervention, the form comprising a user-fillable form related to operation of the rail vehicle as the compute readable information to add data representative of operation conditions of the rail vehicle to the user-fillable form, and to transmit the user-fillable form with the data to the server computer, and wherein the mobile device is configured to receive second information transmitted from the server without human intervention, the second information comprising switching information representative of current switching activities of switches in a vehicle yard responsive to the mobile device disposed onboard the rail vehicle entering into a designated area associated with the vehicle yard.

2. The system of claim 1, wherein the mobile device is configured to enable a user to complete the user-fillable form displayed on the mobile device.

3. The system of claim 2, wherein the user-fillable form is at least one of an inspection report or a failure report.

4. The system of claim 1, wherein the time table information includes information for scheduling operation of the rail vehicle.

5. The system of claim 1, wherein the switch information comprises a switch list comprising information for regulating switching activities.

6. The system of claim 1, wherein the mobile device is configured to wirelessly synchronize the computer-readable information with the server computer.

7. The system of claim 1, wherein the mobile device is configured to receive the computer-readable information from the server computer responsive to a designated time of day.

8. The system of claim 1, wherein the mobile device is configured to provide the location of the mobile device to the server computer to enable the server computer to track movement of the mobile device.

9. The system of claim 1, wherein the computer-readable information that is received during travel of the rail vehicle includes information concerning at least one of movement authorities related to movement of the rail vehicle or movements of one or more other rail vehicles within a designated vicinity of the mobile device.

10. A method comprising:
communicatively coupling a server computer with a hand-held mobile device by at least a portion of a network;
transmitting first computer-readable information from the server computer without human intervention to the mobile device prior to the rail vehicle beginning to move on a trip, the first computer-readable information including at least one of rules information time table information, switch information, or a wheel report;
transmitting second computer-readable information from the server computer without human intervention to the mobile device during travel of the rail vehicle along the trip, the second computer-readable information including a user-fillable form related to operation of the rail vehicle, the user-fillable form configured to be populated with data representative of operating conditions of the rail vehicle by the mobile device: and
receiving the user-fillable form with the data from the mobile device after a user has populated the user-fillable form with the data; and
transmitting third computer-readable information from the server computer without human intervention to the mobile device disposed onboard the rail vehicle responsive to the mobile device disposed onboard the rail vehicle entering into a designated area associated with a vehicle yard, the third computer-readable information representative of current switching activities of switches in the vehicle yard.

11. The method of claim 10, wherein the user-fillable form is at least one of an inspection report or a failure report.

12. The method of claim 10, wherein the second computer-readable information comprises a plurality of computer-readable documents, and wherein the method comprises compiling the plurality of computer-readable documents into a rail vehicle operations kit at the server computer.

13. The method of claim 10, wherein the first computer-readable information comprises at least one of reference materials related to operation of the train or a time table comprising information for scheduling operation of the rail vehicle.

14. The method of claim 10, wherein the first computer-readable information includes one or more of a manual, a rulebook, an authority, or a track restriction for operating the rail vehicle.

15. The method of claim 10, wherein the first computer-readable information comprises a switch list comprising information for regulating switching activities.

16. The method of claim 10, further comprising transmitting the first computer-readable information to the hand-held mobile device based upon a detection of wireless connectivity between the mobile device and the server computer.

17. The method of claim 10, further comprising synchronizing at least one of the first computer-readable information or the second computer-readable information between the server computer and the hand-held mobile device via at least one of a docking station, a wired network access point for the hand-held mobile device, or a wireless network access point for the hand-held mobile device.

18. The method of claim 10, further comprising transmitting at least one of the first computer-readable information or the second computer-readable information to the hand-held mobile device based upon a position of the rail vehicle.

19. The method of claim 10, further comprising transmitting at least one of a limit of movement authority and or a speed limit to the hand-held mobile device.

20. The method of claim 10, wherein at least one of the first computer-readable information or the second computer-readable information is transmitted to the mobile device at a designated time of day.

21. The method of claim 10, further comprising tracking movement of the mobile device by receiving the location of the mobile device.

22. The method of claim 10, wherein at least one of the first computer-readable information or the second computer-readable information includes information concerning at least one of movement authorities related to movement of the rail vehicle or movements of one or more other rail vehicles within a designated vicinity of the mobile device.

23. A method comprising:
  tracking movement of a hand-held mobile device at a server computer;
  transmitting first computer readable information from the server computer without human intervention to the mobile device prior to a rail vehicle beginning to move on a trip, the first computer-readable information including at least one of rules information, time table information, switch information, or a wheel report:
  transmitting second computer-readable information from the server computer without human intervention to the mobile device during travel of the rail vehicle along the trip, the second computer-readable information including a user-fillable form used for operating the rail vehicle, the user-fillable form configured to be populated with data related to operating conditions of the rail vehicle by the mobile device;
  receiving the user-fillable form with the data from the mobile device after a user has populated the user-fillable form with the data; and
  transmitting third computer-readable information from the server computer without human intervention to the mobile device disposed onboard the rail vehicle responsive to the mobile device entering into a designated area associated with a vehicle yard, the third computer-readable information representative of switching activities of switches in the vehicle yard.

24. The method of claim 23, further comprising receiving a plurality of completed user-fillable forms into a database.

25. The method of claim 23, wherein the user-fillable form is transmitted to the mobile device responsive to a designated a time of day.

26. A method comprising:
  compiling computer-readable documents used for operating a rail vehicle to form a rail vehicle operations kit at a server computer;
  tracking movement of a hand-held mobile device;
  prior to the rail vehicle beginning to move on a trip, transmitting a first subset of the one-computer-readable documents of the rail vehicle operations kit from the server computer without human intervention to the mobile device over a network, the first subset including at least one of rules information, time table information, switch information, or a wheel report;
  during travel of the rail vehicle along the trip, transmitting a second subset of the computer-readable documents from the server computer without human intervention to the mobile device, the second subset including a user-fillable form configured to be populated by the mobile device with data representative of operating conditions of the rail vehicle;
  displaying the one or more computer-readable documents on a display of the mobile device; and
  responsive to arrival of the mobile device and the rail vehicle at a vehicle yard, transmitting a third subset of the computer-readable documents from the server computer without human intervention to the mobile device, the third subset of the computer-readable documents representative of switching activities of switches in the vehicle yard.

27. The method of claim 26, wherein the one or more of the computer-readable documents are transmitted to the mobile device responsive to a designated time of day.

* * * * *

UNITED STATES PATENT AND TRADEMARK OFFICE
CERTIFICATE OF CORRECTION

PATENT NO. : 8,386,281 B2
APPLICATION NO. : 12/356186
DATED : February 26, 2013
INVENTOR(S) : Goodermuth et al.

Page 1 of 2

It is certified that error appears in the above-identified patent and that said Letters Patent is hereby corrected as shown below:

In the Claims

In Column 11, Line 1, in Claim 1, delete "wherein" and insert -- wherein, --, therefor.

In Column 11, Line 2, in Claim 1, delete "trip" and insert -- trip, --, therefor.

In Column 11, Line 8, in Claim 1, delete "wherein" and insert -- wherein, --, therefor.

In Column 11, Lines 12-13, in Claim 1, delete "compute readable information to add data representative of operation" and
insert -- computer-readable information, to add data representative of operating --, therefor.

In Column 11, Line 60, in Claim 10, delete "information time" and insert -- information, time --, therefor.

In Column 12, Line 2, in Claim 10, delete "device: and" and insert -- device; --, therefor.

In Column 12, Lines 13-14, in Claim 10, delete "activities of switches in the" and insert -- activities in the --, therefor.

In Column 13, Line 4, in Claim 23, delete "computer readable" and insert -- computer-readable --, therefor.

In Column 13, Line 9, in Claim 23, delete "report:" and insert -- report; --, therefor.

In Column 13, Lines 27-28, in Claim 23, delete "activities of switches in" and
insert -- activities in --, therefor.

In Column 13, Line 32, in Claim 25, delete "a time of day." and insert -- time of day. --, therefor.

Signed and Sealed this
Fourteenth Day of May, 2013

Teresa Stanek Rea
*Acting Director of the United States Patent and Trademark Office*

CERTIFICATE OF CORRECTION (continued)
U.S. Pat. No. 8,386,281 B2

In Column 14, Line 7, in Claim 26, delete "the one-computer-readable" and insert
-- the computer-readable --, therefor.

In Column 14, Line 27, in Claim 26, delete "activities of switches in" and insert -- activities in --, therefor.